United States Patent
Patton (10) Patent No.: US 11,150,726 B2
(45) Date of Patent: Oct. 19, 2021

(54) SYSTEMS AND METHODS FOR OBSCURING GLARE IN A VEHICLE

(71) Applicant: Sean Patton, Irvine, CA (US)

(72) Inventor: Sean Patton, Irvine, CA (US)

(73) Assignee: Sean Patton, Newport Beach, CA (US)

( * ) Notice: Subject to any disclaimer, the term of this patent is extended or adjusted under 35 U.S.C. 154(b) by 0 days.

(21) Appl. No.: 16/663,284

(22) Filed: Oct. 24, 2019

(65) Prior Publication Data

US 2020/0133390 A1  Apr. 30, 2020

Related U.S. Application Data

(60) Provisional application No. 62/750,093, filed on Oct. 24, 2018.

(51) Int. Cl.
| | |
|---|---|
| *G06F 3/01* | (2006.01) |
| *B60J 3/04* | (2006.01) |
| *B60R 1/00* | (2006.01) |
| *G09G 5/38* | (2006.01) |

(52) U.S. Cl.
CPC ............ *G06F 3/013* (2013.01); *B60J 3/04* (2013.01); *B60R 1/00* (2013.01); *G09G 5/38* (2013.01); *B60R 2300/108* (2013.01); *B60R 2300/20* (2013.01); *B60R 2300/80* (2013.01); *G09G 2380/10* (2013.01)

(58) Field of Classification Search
CPC ........................................................ B60J 3/04
See application file for complete search history.

(56) References Cited

U.S. PATENT DOCUMENTS

| | | | | |
|---|---|---|---|---|
| 5,305,012 A | * | 4/1994 | Faris | A61F 9/023 |
| | | | | 345/7 |
| 9,630,477 B2 | * | 4/2017 | Ro | B60J 3/04 |
| 10,589,660 B2 | * | 3/2020 | Kimura | H01L 27/14634 |
| 2009/0168185 A1 | * | 7/2009 | Augustine | B60J 3/04 |
| | | | | 359/613 |
| 2009/0204291 A1 | * | 8/2009 | Cernasov | G02C 7/101 |
| | | | | 701/36 |
| 2013/0286177 A1 | * | 10/2013 | Deleeuw | G02B 27/0093 |
| | | | | 348/77 |
| 2014/0320946 A1 | * | 10/2014 | Tomkins | B60J 3/04 |
| | | | | 359/275 |
| 2019/0047382 A1 | * | 2/2019 | Glatfelter | B60J 3/02 |

* cited by examiner

*Primary Examiner* — Sepehr Azari
(74) *Attorney, Agent, or Firm* — Ryan Dean; Umberg Zipser LLP (57) ABSTRACT

Systems and methods for obscuring glares that are present on a windshield, mirror other surface of a vehicle are presented. The systems and methods comprise first and second sets of CCD cameras, where the first set is used to provide information about a source of a glare and the second set is used to provide information about eyes of a driver, for example. Based on the information gathered, locations of the source of the glare and the driver's eyes can be triangulated, and a position where light from the source of the glare is incident on the windshield or other surface can be determined. A translucent spot can be generated at that position to obscure the glare (light) from reaching the driver's eyes.

12 Claims, 7 Drawing Sheets

SYSTEMS AND METHODS FOR OBSCURING GLARE IN A VEHICLE

This application claims priority to U.S. provisional application having Ser. No. 62/750,093 filed on Oct. 24, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is the use of a transparent display screen to dynamically create non-opaque spots on the display screen to reduce glare in a vehicle.

BACKGROUND

The following description includes information that may be useful in understanding the present invention. It is not an admission that any of the information provided herein is prior art or relevant to the presently claimed invention, or that any publication specifically or implicitly referenced is prior art.

Despite the use of sunglasses and/or sun visors, problems with light and glare when driving continue to cause accidents and other issues. For example, uncontrolled glare may conceal oncoming traffic, and limit a driver's ability to see road signs and brake lights. The existing solutions have limited use as they are not able to adapt to movement of the glare as the vehicle moves. For example, a location of the glare depends on the source of the glare, the location of the vehicle, and the specific location of the driver within the vehicle and a rotation angle of the driver's head.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for systems and methods that can reduce glare in a vehicle for drivers and/or passengers that is dynamic to match movement of the vehicle and source of the glare.

SUMMARY OF THE INVENTION

The inventive subject matter provides apparatus, systems and methods for obscuring glares that occur on one or more windows and/or reflective surfaces of a vehicle. Preferred systems include first and second sets of CCD cameras, where the first set is positioned to track a glare and the second set is positioned to track the eyes of a passenger or driver of the vehicle. A processor is used to analyze the data received from the first and second sets of CCD cameras and determine where to generate a translucent spot on a translucent display that is disposed on a window, reflective surface or visor of the vehicle.

Advantageously, the systems and methods described herein can track movement of the glare on the window or reflective surface and cause the translucent spot to move to compensate for movement of the glare and/or movement of the eyes of the passenger or driver. Still further, the systems and methods can be used to track a plurality of glares of the window or reflective surface and create multiple translucent spots, with each spot having a degree of translucency that matches an intensity and size of the glare.

In one embodiment, the system functions as follows: a glare is detected by the CCD cameras located on the exterior of the windshield in three-dimensional (3D) space. The information is communicated to a server that is tracking the location of the user's eyes in 3D space by the interior facing camera(s). The server then calculates where the placement of (a) translucent spot should be on the transparent display, preferably an OLED display with the appropriate size, shape and opacity (degree of translucency). As the driver moves her head in the car, the server can subtly adjust the location of the translucent spot(s) to ensure that at all times the driver is protected from the visually impeding glare. In another embodiment, the transparent display is flexible and formable into any shape. It can be disposed on a windshield glass at the point of manufacture or it may be installed as an accessory into any vehicle. The transparent display can also work as an accessory item in a rear view mirror or side mirror. In this accessory embodiment the cameras can be installed on the exterior of the car, for example.

In another embodiment the CCD cameras can capture difficult to see street signs at a distance and display those street signs on the display for ease of viewing. This can also be done for freeway entry and exit signs, warnings, directions, and so forth. The display could also display map data and directions, or other important or desired information.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding processors, servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
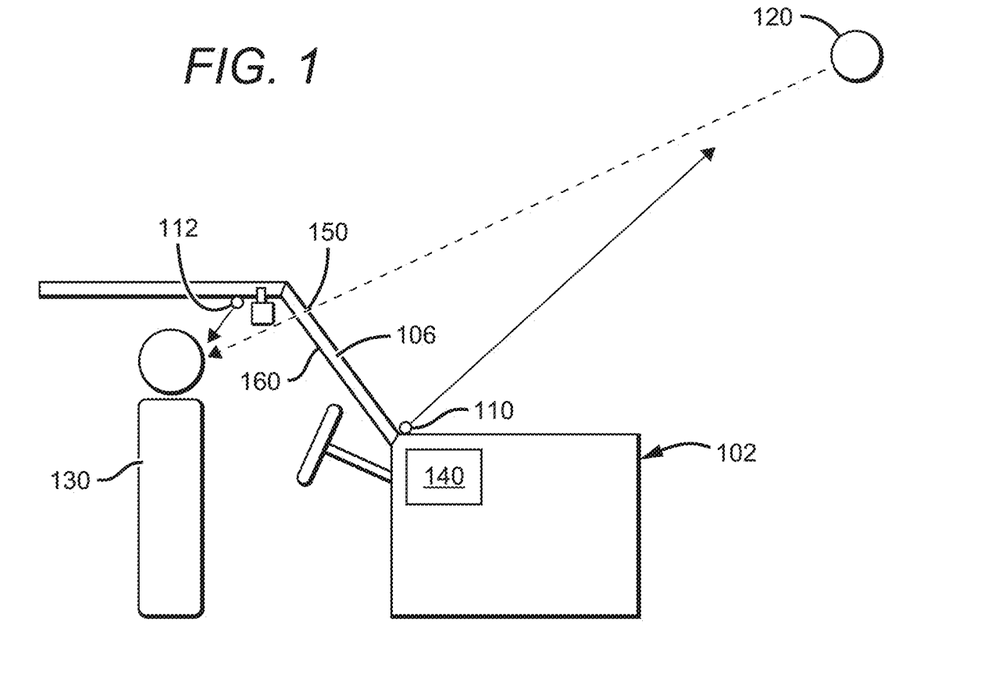
FIGS. 1-2 illustrate a diagram of one embodiment of a system for obscuring glare in vehicle.
Figure 2:
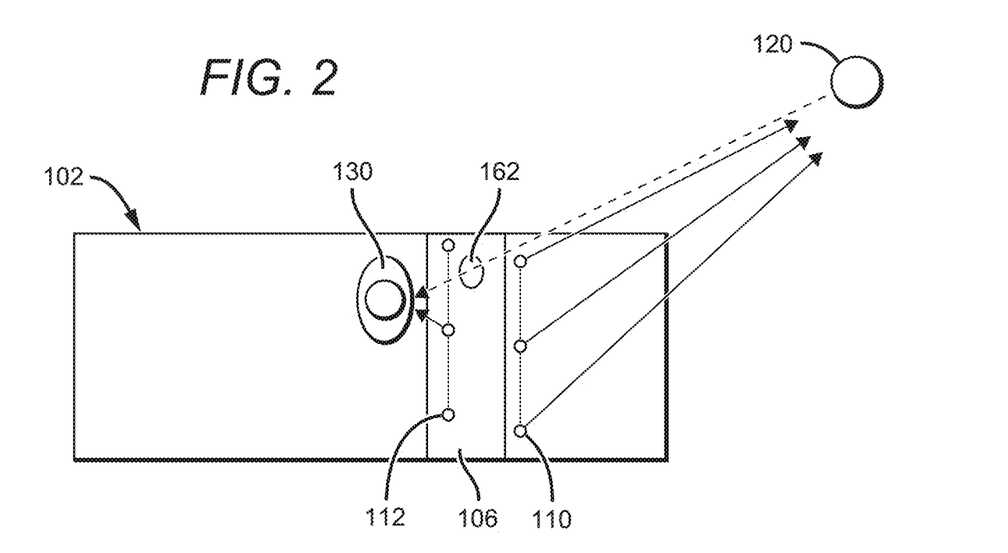

FIGS. 1-2 illustrate one embodiment of a system 100 for reducing glare in a vehicle 102 having a transparent display 160 disposed on or embedded within a windshield 106 of the vehicle 102. Although shown on the windshield, it is contemplated that the transparent display 160 could be disposed on one or both side view mirrors, the rear view mirror, side windows, back window, or sun visors of the vehicle. In some embodiments, multiple of these surfaces can have a transparent display, such that front passenger and driver windows as well as the front windshield of a vehicle may each have a transparent display that can generate translucent spots when glares are detected to obscure an intensity of the glare that may reach a driver's or passenger's eyes.

The system 100 preferably includes a first set 110 and a second set 112 of charge coupled device (CCD) cameras that are disposed on or within the vehicle 100. Although CCD cameras are preferred, it is contemplated that other devices could be used that are capable of detecting light.

The first set 110 of CCD cameras are preferably disposed such that a sensor in each of the CCD cameras 110 is directed to face away from the vehicle 102 and detect a source of glare 120 in each of the CCD cameras is directed to face away from the vehicle and detect a source of glare 120 on the windshield 106 of the vehicle 102 on the windshield 106.

The second set 112 of CCD cameras are preferably disposed such that a sensor in each of the CCD cameras 112 is directed to face toward an interior of the vehicle 102 and detect a position of the eyes of a driver 130.

A server 140 having a processor and memory can be configured to receive signals or other information from the first and second sets of CCD cameras 110 and 112. Based on the received information about the glare from the first set of CCD cameras 110 and the received information about the position of the driver's eyes from the second set of CCD cameras 112, and based on the location of each of the CCD cameras and the transparent display 160, the processor is configured to triangulate a first position 150 where light from the glare contacts the windshield 106 and passes through to reach the driver's eyes.

The processor can then cause the transparent display 160 to present a translucent spot 162 at the first position 150.

Because it is often the case that the vehicle 102 is moving when glares are an issue (or the glares themselves may be moving), it is preferred that the system 100 can track a position of a source 120 of the glare relative to the vehicle 102 and update a position of the translucent spot 162 on the display accordingly.

Thus, for example, the first set of CCD cameras 110 can track a position of the source 120 of the glare relative to the vehicle 102 through triangulation, and the server 140 can receive revised signals or information from the first set 110. The processor can be configured to calculate a second position 152 where light from the glare contacts the windshield 106 and passes through to reach the driver's eyes, where the second position 152 is different from the first position 150. The processor can then cause the transparent display 160 to present the translucent spot 162 at the second position 152.

The system 100 can also track movement of the driver's eyes or passenger's eyes and cause the translucent spot 162 to move on the transparent display 160 according to the position of the eyes. Thus, for example, if a driver turned her head to the left, the translucent spot 162 could be regenerated in a second position to account for the new location of her eyes relative to the glare and display 160.

It is possible that more than one glare may be present on the windshield 106 or other surface of the vehicle, and the system 100 is preferably configured to track a position of each source of glare, and generate a plurality of translucent spots on the transparent display 160. In such cases, the processor can be configured to receive information about a position of a second source of glare through triangulation with the first set of CCD cameras 110, and calculate a position where light from the second source of glare contacts the windshield 106 and passes through to the driver's eyes. The processor can then cause a second translucent spot to be generated on the transparent display at that position.

When the source of glare no longer is in view, or the source no longer causes glare on the windshield 106 or other surface, the processor can cause the translucent spot 162 to be removed from the display 160. Similarly, it is contemplated that the display 160 is biased to be transparent, so without signal or power, the driver's view will not be obscured.

As shown in FIG. 2, each of the first and second set of CCD cameras preferably comprises at least three cameras to permit triangulation of the source of the glare and the eyes of the driver or passenger. The precise location of each along with the known locations of the CCD cameras and the display itself permits the translucent spot to be smaller in size and therefore obscure less of the surface.

Figure 3A:
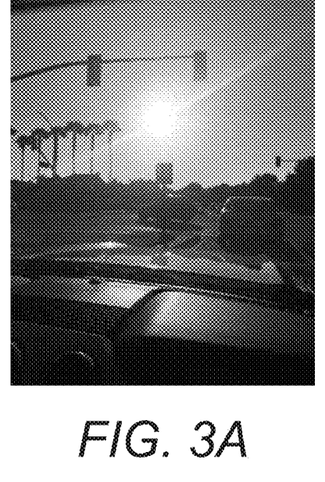
FIGS. 3A-3B illustrates views through a windshield of the vehicle with and without the translucent spot.
Figure 3B:
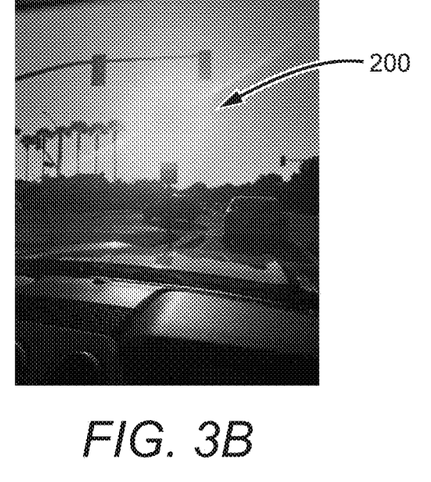

FIGS. 3A-3B illustrate an exemplary embodiment of the system comparing a windshield with glare from the sun in FIG. 3A with a windshield having a translucent spot 200 in FIG. 3B.

Figure 4A:
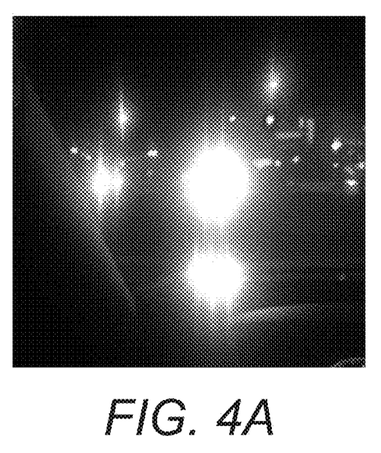
FIGS. 4A-4B illustrates views through a windshield of the vehicle with and without the translucent spot.
Figure 4B:
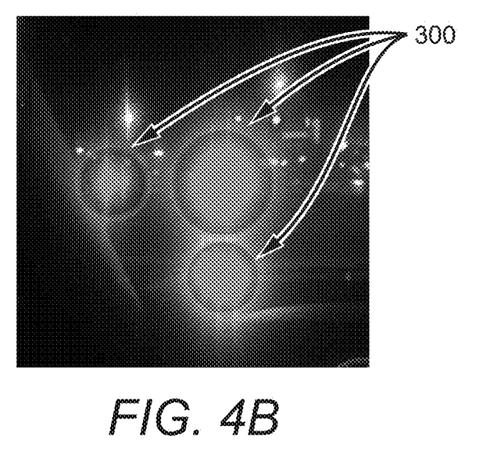

FIGS. 4A-4B illustrate another embodiment of the system comparing a windshield with glare from various car lights in FIG. 4A with a windshield having multiple translucent spots 300 in FIG. 4B.

Figure 5:
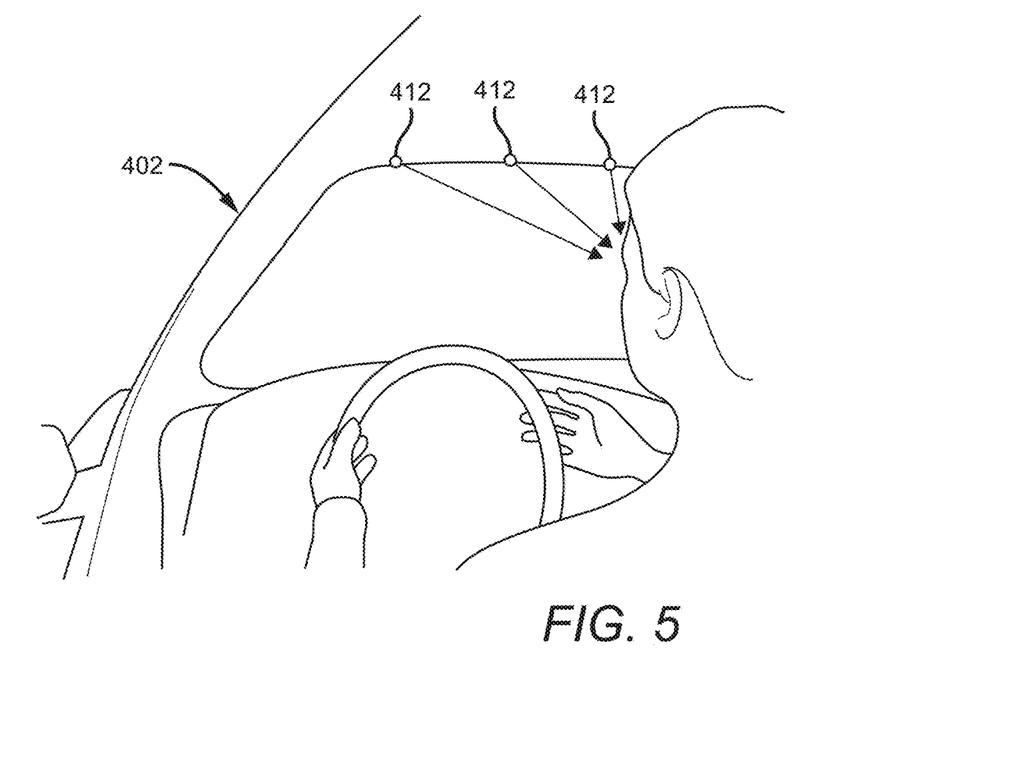
FIG. 5 illustrates an exemplary embodiment of the system showing one possible placement of CCD cameras.
Figure 6:
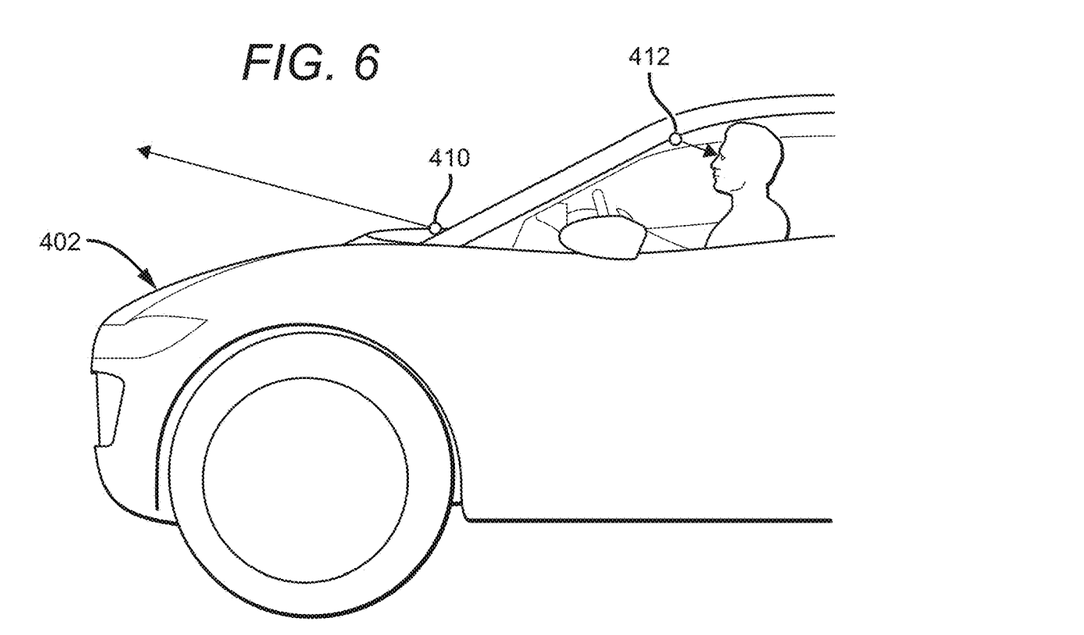
FIG. 6 illustrates another exemplary embodiment of the system showing another possible placement of CCD cameras.
Figure 7:
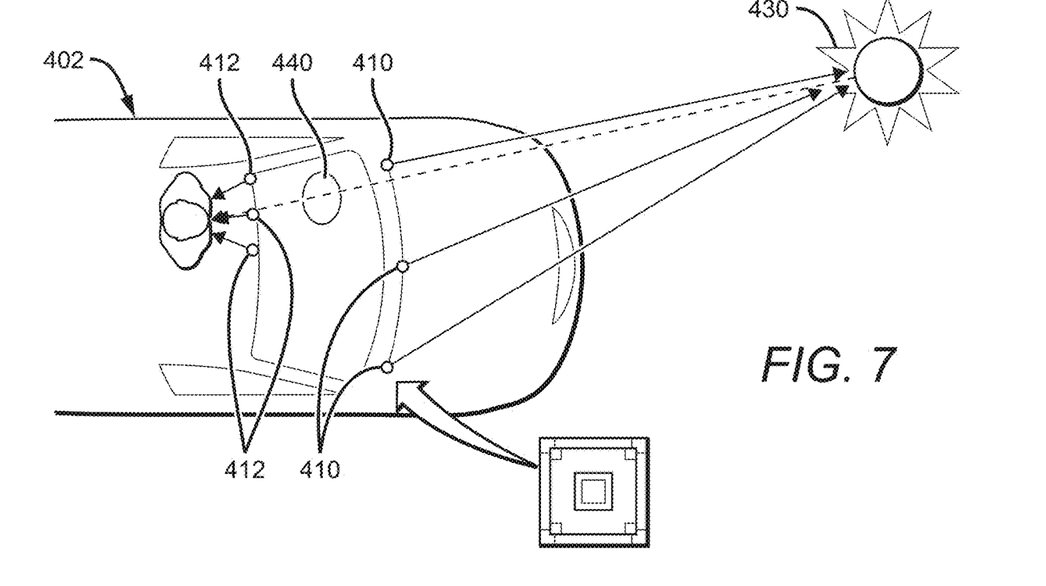
FIG. 7 illustrates another embodiment of the system showing the translucent spot on the windshield.

FIGS. 5-7 illustrates one possible placement of the second set of CCD cameras 412 in a vehicle 402, which can be used to track eyes of a driver, for example. FIG. 6 illustrates a possible placement of the first set of CCD cameras 410 that face outwardly from the vehicle 402, which can be used to track sources of glare 430. Once the position of the glare is triangulated, and the position of the driver's eyes is determined, a position for a translucent spot 440 on the transparent display on the windshield.

Figure 8:
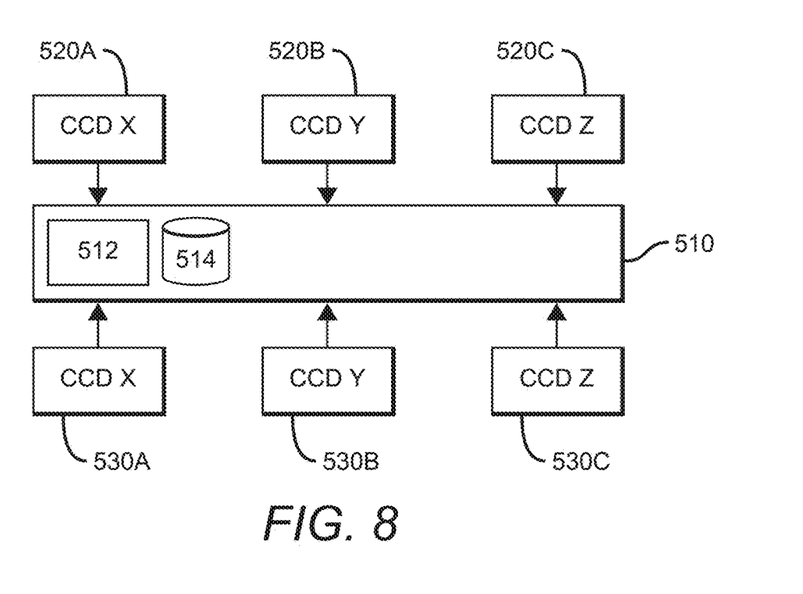
FIG. 8 illustrates another embodiment of the system.

FIG. 8 illustrates another embodiment of a system 500 having a server 510 with a processor 512 and memory 514. The server 510 is coupled with a first set of CCD cameras having three cameras 520A, 520B, and 520C. The server 510 is also coupled with a second set of CCD cameras having three cameras 530A, 530B, and 530C. The server 510 is configured to receive signals or other information from the CCD cameras and generate commands to one or more transparent displays based on the information received.

It is contemplated that the server could store a location of each of the CCD cameras and the transparent display(s) in the memory 514 for access when determining the position of the translucent spot(s).

Figure 9:
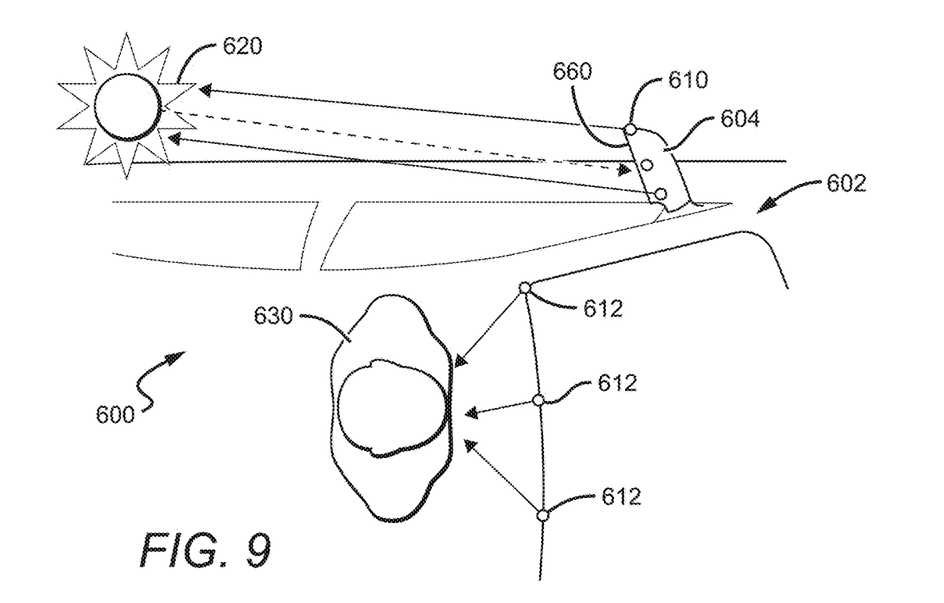
FIG. 9 illustrates another embodiment of a system where glare is monitored on a side view mirror of the vehicle.

FIG. 9 illustrates another embodiment of a system 600 for reducing glare in a vehicle 602 having a transparent display 660 disposed on a side view mirror 604 of the vehicle 602. The system 600 comprises a first set 610 of CCD cameras disposed on the side view mirror 604, such that a sensor in each of the CCD cameras 610 is disposed to face away from the vehicle 602 and detect a source of glare 620. The position of the source of glare 620 can then be triangulated based on the information received from the CCD cameras of the first set 610, and the known locations of each of the CCD cameras.

The system 600 also comprises a second set 612 of CCD cameras disposed within the vehicle 602. The second set 612 of CCD cameras are preferably disposed such that a sensor in each of the CCD cameras 612 is directed to face toward an interior of the vehicle 602 and detect a position of the eyes of a driver 630.

A server having a processor and memory can be configured to receive signals or other information from the first and second sets of CCD cameras 610 and 612. Based on the received information about the glare from the first set of CCD cameras 610 and the received information about the position of the driver's eyes from the second set of CCD cameras 612, and based on the location of each of the CCD cameras and the transparent display 660, the processor is configured to triangulate a first position where light from the glare contacts the side view mirror 604 and reflects on to the driver's eyes.

The processor can then cause the transparent display 660 to present a translucent spot at the first position on the side view mirror, or alternatively, the driver's side window.

It is contemplated that the system could be configured to track multiple glares and update a position of the translucent spot(s) as the position of the glares move on the vehicle's surfaces.

Figure 10:
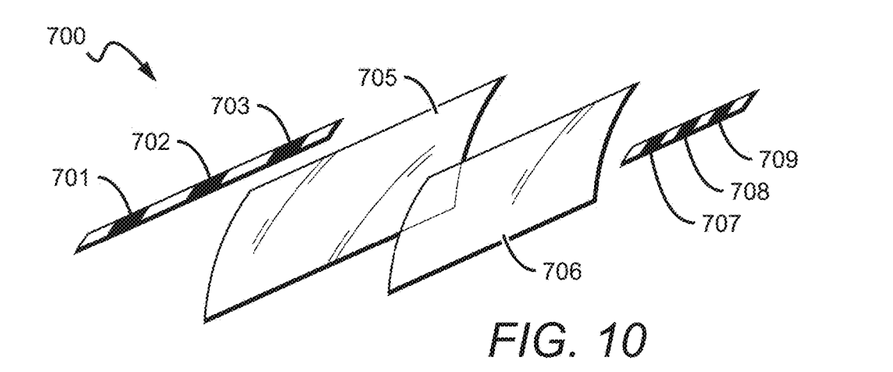
FIGS. 10-11 are exploded views of components in various embodiments of the system.

FIG. 10 illustrates another embodiment of a system 700 having a windshield 705 for a vehicle with a transparent display 706 disposed to cover at least a portion of the windshield 705. A first set of CCD cameras 701-703 can be disposed such that they are facing outwardly from the vehicle and can detect a source of glare and relay information about the source to a processor for triangulation of its position relative to the vehicle.

A second set of CCD cameras 707-709 can be disposed such that they are facing inwardly toward the driver or passenger of the vehicle and can detect eyes of the driver or passenger and relay information about the eyes to a processor for triangulation of its position relative.

Figure 11:
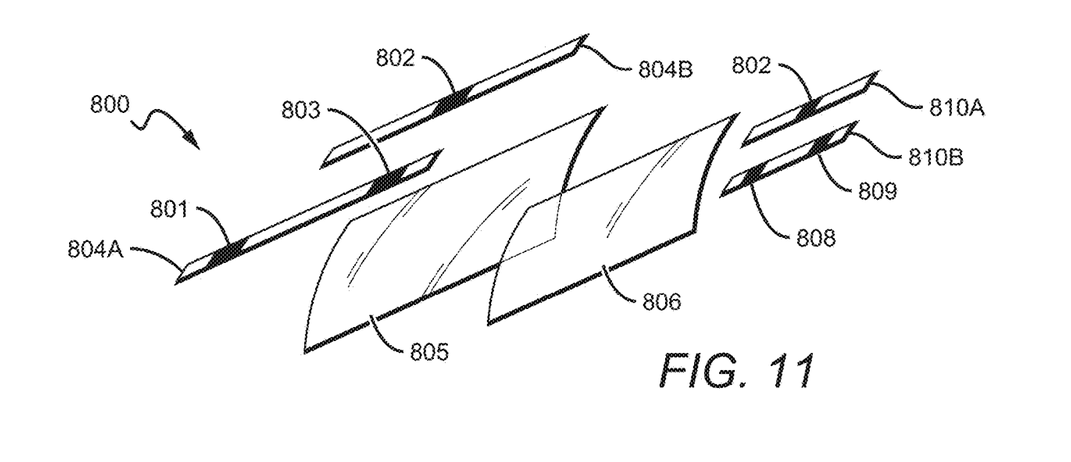

FIG. 11 illustrates another embodiment of a system 800 having a windshield 805 for a vehicle with a transparent display 806 disposed to cover at least a portion of the windshield 805. A first set of CCD cameras 801-803 can be disposed such that they are facing outwardly from the vehicle and can detect a source of glare and relay information about the source to a processor for triangulation of its position relative to the vehicle. As shown, the cameras of the first set are disposed in two strips, with cameras 801 and 803 on a first strip 804A and camera 802 on a separate strip 804B. It is contemplated that the first strip could be disposed at one end of the windshield 805 with the second strip being disposed at the other end of the windshield 805. In a simple example, one at the top and one at the bottom.

A second set of CCD cameras 807-809 can be disposed such that they are facing inwardly toward the driver or passenger of the vehicle and can detect eyes of the driver or passenger and relay information about the eyes to a processor for triangulation of its position relative. As shown, the cameras of the second set are also disposed in two strips, with cameras 807 and 809 on a second strip 810B and camera 808 on a separate strip 810A. It is contemplated that the first strip could be disposed at one end of the windshield 805 with the second strip being disposed at the other end of the windshield 805. In a simple example, one at the top and one at the bottom.

Figure 12A:
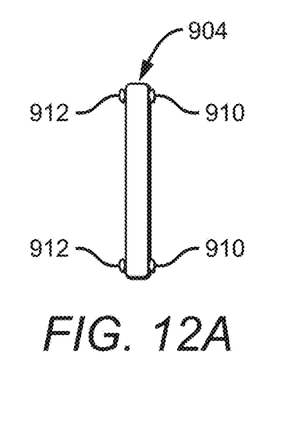
FIGS. 12A-12B are side and front views of a visor having CCD cameras and a transparent display.
Figure 12B:
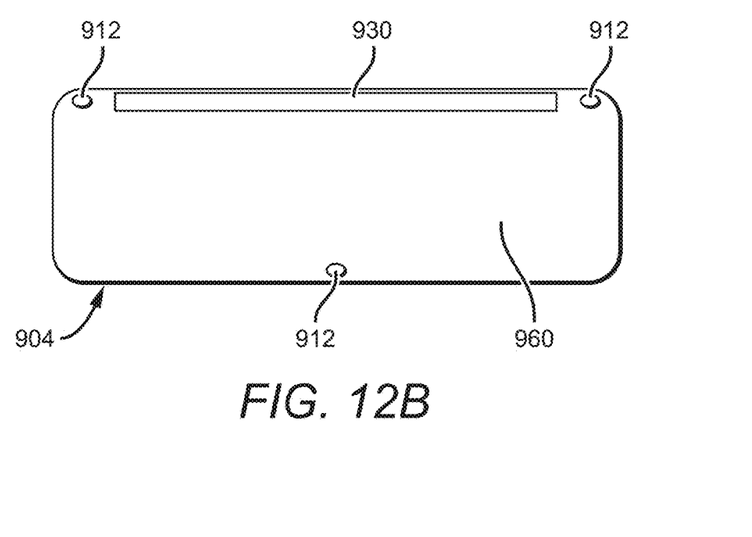
Figure 13:
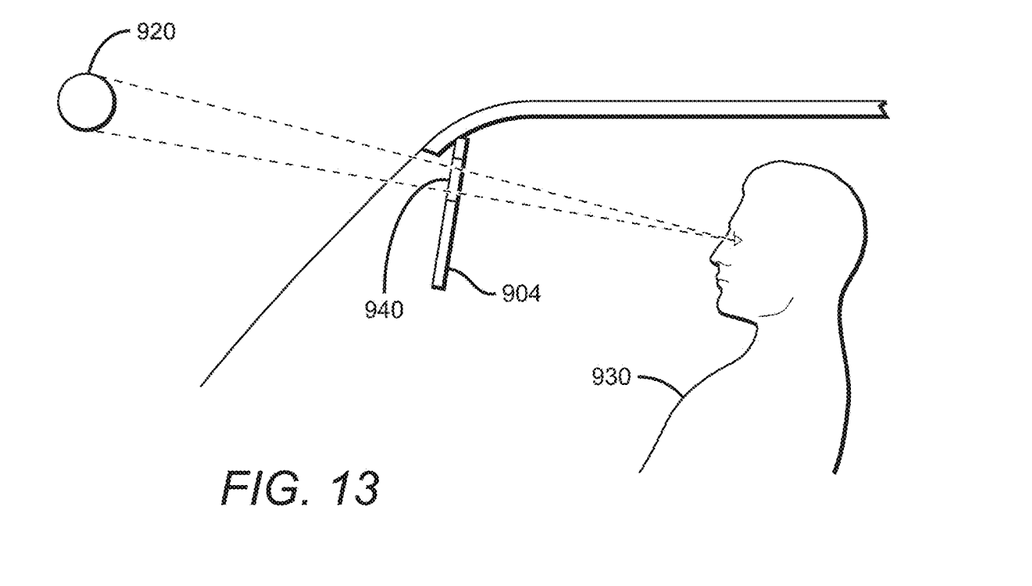
FIG. 13 illustrates use of the visor in a vehicle.

FIGS. 12A-13 illustrates another embodiment of a system 900 for reducing glare in a vehicle having a transparent display 960 disposed on a visor 904 that is typically mounted to an interior of a roof of the vehicle 902. In such embodiments, it is contemplated that the second set 912 of CCD cameras can be disposed on the visor 904, such that a sensor in each of the CCD cameras 912 is directed to face toward an interior of the vehicle 902 and detect a position of the eyes of a driver 930.

A first set 910 of CCD cameras can be disposed on an opposite side of the visor 904, such that a sensor in each of the CCD cameras 910 is disposed to face away from the vehicle and detect a source of glare 920. The position of the source of glare 920 can then be triangulated based on the information received from the CCD cameras of the first set 910, and the known locations of each of the CCD cameras.

A server having a processor and memory can be configured to receive signals or other information from the first and second sets of CCD cameras 910 and 912. Based on the received information about the glare from the first set of CCD cameras 910 and the received information about the position of the driver's eyes from the second set of CCD cameras 912, and based on the location of each of the CCD cameras and the transparent display 960, the processor is configured to triangulate a first position where light from the glare contacts the visor 904.

The processor can then cause the transparent display 660 to present a translucent spot 940 at the first position on the visor 904. It is contemplated that the system could be configured to track multiple glares and update a position of the translucent spot(s) as the position of the glares move on the vehicle's surfaces.

Figure 14:
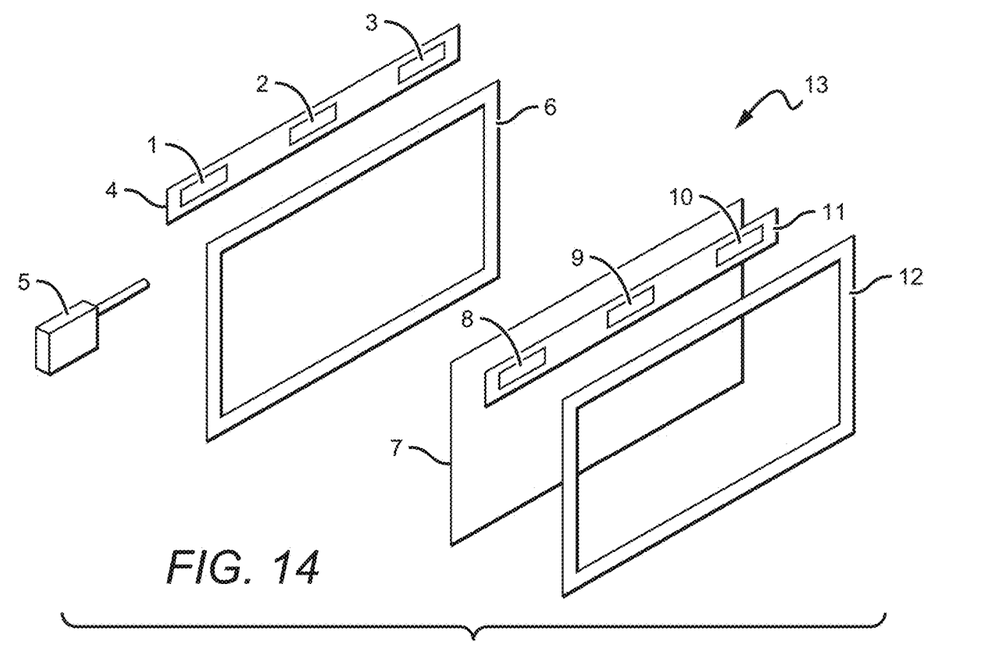
FIGS. 14-15 are exploded views of components in various embodiments of the system embodied in a visor.

FIG. 14 illustrates another embodiment of a system 13 having a visor 6 for a vehicle with a transparent display 7. A first set of CCD cameras 1-3 can be disposed on a first strip 4 such that they are facing outwardly from the vehicle and can detect a source of glare and relay information about the source to a processor for triangulation of its position relative to the vehicle. A second set of CCD cameras 8-10 can be disposed on a second strip 11 such that they are facing inwardly toward the driver or passenger of the vehicle and can detect eyes of the driver or passenger and relay information about the eyes to a processor for triangulation of its position relative. One or both strips can include a microchip and processor enabled to process the data received from the CCD cameras.

Figure 15:
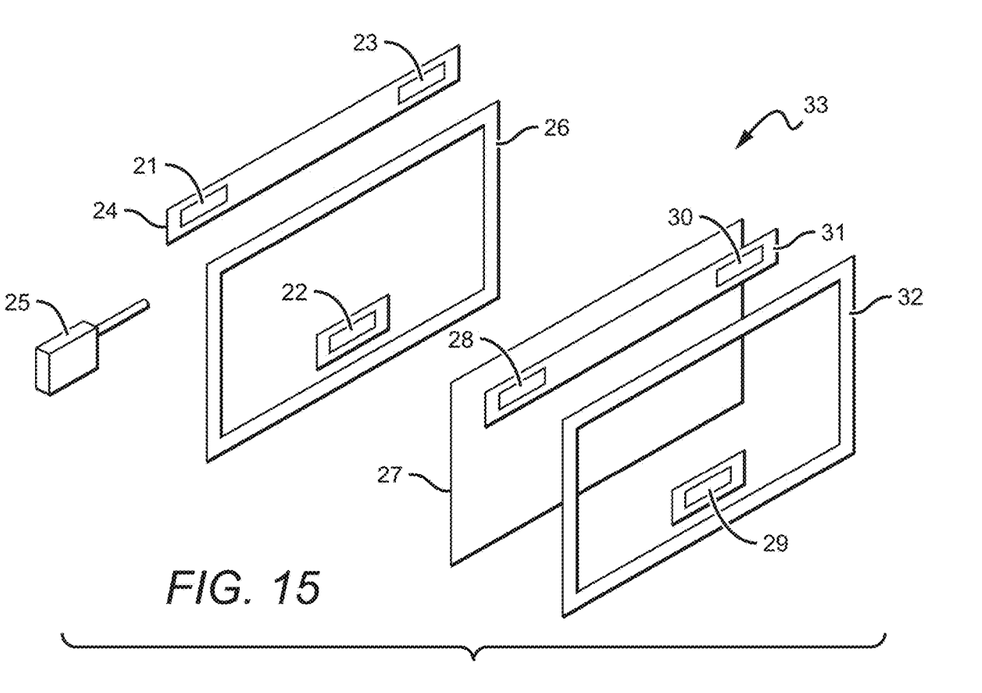

FIG. 15 illustrates another embodiment of a system 33 having a visor 26 for a vehicle with a transparent display 27. A first set of CCD cameras 21-23 can be disposed on a first strip 24 such that they are facing outwardly from the vehicle and can detect a source of glare and relay information about the source to a processor for triangulation of its position relative to the vehicle. As shown, the cameras of the first set are disposed in two strips, with cameras 21 and 23 on a first strip 24 and camera 22 on a separate strip. It is contemplated that the first strip could be disposed at one end of the visor 26 with the second strip being disposed at the other end of the visor 26. In a simple example, one at the top and one at the bottom.

A second set of CCD cameras 28-30 can be disposed on a second strip 31 such that they are facing inwardly toward the driver or passenger of the vehicle and can detect eyes of the driver or passenger and relay information about the eyes to a processor for triangulation of its position relative. One or both strips can include a microchip and processor enabled to process the data received from the CCD cameras. As shown, the cameras of the second set are also disposed in two strips, with cameras 28 and 30 on a first strip 31 and camera 29 on a separate strip. It is contemplated that the first strip could be disposed at one end of the visor 26 with the second strip being disposed at the other end of the visor 26. In a simple example, one at the top and one at the bottom.

For all of the above embodiments, it is contemplated that the CCD cameras can be configured to track a movement, size, and intensity of the glare, and provide this information to the server for processing. In some embodiments, the CCD cameras can also capture a color of a surrounding environment. With this information, the processor can be configured to cause the translucent spot to be generated that is based on the movement, size, and intensity of the glare, which could affect a size, shape or opacity (degree of a translucency) of the translucent spot, for example.

Using the color of the surrounding area, it is contemplated that the translucent spot could have a similar color such that a driver would not immediately notice the translucent spot on the display, as the translucent spot could blend in with the sky, a structure, or other surrounding. In this manner, a driver is less likely to be distracted by the translucent spot's appearance, especially as the translucent spot may move on the display to correct for the movement of the vehicle, driver's eyes or the glare itself. In addition to movement of the translucent spot, it is contemplated that the degree of translucency, size, shape and color of the translucent spot could vary over time and as it moves based on the information received from the CCD cameras or other sensors.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for reducing glare in a vehicle having a transparent display affixed to a mirror or window surface of the vehicle, comprising:
    a first set of CCD cameras comprising at least three CCD cameras, each of which is disposed on the vehicle such that a sensor in each of the CCD cameras is directed to face away from the vehicle and detect a source of glare on a mirror or window surface of the vehicle, wherein at least one of the first set of CCD cameras is disposed on a first strip above the mirror or window surface and another of the first set of CCD cameras is disposed on a second strip below the mirror or window surface, wherein each of the first and second strips comprises a microchip and processor enabled to process the data received from the at least one of the first set of CCD cameras disposed on each strip;

a second set of CCD cameras comprising at least three CCD cameras, each of which is disposed such that a sensor in each of the CCD cameras is directed to face toward an interior of the vehicle and detect a position of eyes of a driver, wherein at least one of the second set of CCD cameras is disposed on a third strip above the mirror or window surface and another of the second set of CCD cameras is disposed on a fourth strip below the mirror or window surface, wherein each of the third and fourth strips comprises a microchip and processor enabled to process the data received from the at least one of the second set of CCD cameras disposed on each strip;

a third set of CCD cameras, each of which is disposed on the vehicle such that a sensor in each of the CCD cameras is directed to face away from the vehicle and detect a street sign disposed outside of the vehicle;

a processor configured to (i) receive information about the glare collected by the first set of CCD cameras, and information about the position of the driver's eyes collected by the second set of CCD cameras, and (ii) triangulate a first position where light from the glare contacts the mirror or window surface of the vehicle and reflects from or passes through to the driver's eyes based on the received information and a known location of each of the first and second sets of CCD cameras; and wherein the processor is further configured to cause a translucent spot having a degree of translucency to be generated on the transparent display at the first position based on the movement, size, and intensity of the glare, and wherein the degree of translucency depends on the intensity of the glare;

wherein the processor is further configured to cause an enlarged version of the street sign to be displayed on the transparent display.

2. The system of claim 1, wherein the processor is further configured to receive revised information about at least one of the source of the glare and the position of eyes, and triangulate a second position where light from the glare contacts the mirror or window surface of the vehicle and reflects from or passes through to the driver's eyes, wherein the second position is different from the first position.

3. The system of claim 2, wherein the processor is further configured to cause the translucent spot to be generated on the transparent display at the second position.

4. The system of claim 1, wherein the processor is further configured to receive information about a second source of glare, and triangulate a second position where light from the second source of glare contacts the mirror or window surface of the vehicle and reflects from or passes through to the driver's eyes, and wherein the processor is further configured to cause a second translucent spot to be generated on the transparent display at the second position.

5. The system of claim 1, wherein the processor is further configured to receive revised information about the source of the glare, and based on the revised information cause the translucent spot to be removed from the transparent display.

6. The system of claim 1, wherein each of the first set of CCD cameras is configured to track a movement, size, and intensity of the glare from the source, and wherein the information about the glare comprises the movement, size, and intensity of the glare.

7. The system of claim 1, wherein each of the first set of CCD cameras is configured to monitor a color of a surrounding adjacent the source of the glare, and wherein the processor is further configured to cause the translucent spot to have a color similar to the surrounding.

8. The system of claim 1, wherein the transparent display in disposed on a front windshield of the vehicle.

9. A system for reducing glare in a vehicle, consisting of:
a transparent display affixed to a windshield of the vehicle;
a first set of CCD cameras comprising at least three CCD cameras, each of which is disposed such that a sensor in each of the CCD cameras is directed to face away from the windshield of the vehicle and detect a source of glare on the windshield, wherein at least one of the first set of CCD cameras is disposed on a first strip above the windshield and another of the first set of CCD cameras is disposed on a second strip below the windshield, wherein each of the first and second strips comprises a microchip and processor enabled to process the data received from the at least one of the first set of CCD cameras disposed on each strip;
a second set of CCD cameras comprising at least three CCD cameras, each of which is disposed such that a sensor in each of the CCD cameras is directed to face toward an interior of the vehicle and detect a position of eyes of a driver, wherein at least one of the second set of CCD cameras is disposed on a third strip above the windshield and another of the second set of CCD cameras is disposed on a fourth strip below the windshield, wherein each of the third and fourth strips comprises a microchip and processor enabled to process the data received from the at least one of the second set of CCD cameras disposed on each strip;
a processor configured to receive information about the glare from the first set of CCD cameras, and information about the position of the driver's eyes from the second set of CCD cameras;
the processor is configured to triangulate a first position on the windshield where light from the glare contacts the windshield of the vehicle and reflects from or passes through to the driver's eyes based on the received information and a known location of each of the CCD cameras relative to the transparent display; and
wherein the processor is further configured to cause a translucent spot to be generated on the transparent display at the first position on the windshield;
wherein the processor is further configured to continuously receive revised information about at least one of the source of the glare and the position of eyes, and upon receipt of the revised information, triangulate an updated position where light from the glare contacts the windshield of the vehicle and reflects from or passes through to the driver's eyes, wherein the updated position is different from the first position, and wherein the processor is further configured to cause the translucent spot to be generated on the transparent display at the updated position.

10. The system of claim 9, wherein each of the first set of CCD cameras is configured to track a movement, size, and intensity of the glare from the source, and wherein the information about the glare comprises the movement, size, and intensity of the glare, and wherein the processor is further configured to generate the translucent spot at the first position based on the movement, size, and intensity of the glare.

11. The system of claim 10, wherein a degree of a translucency of the translucent spot depends on the intensity of the glare.

12. The system of claim 10, wherein each of the first set of CCD cameras is configured to monitor a color of a surrounding adjacent the source of the glare, and wherein the processor is further configured to cause the translucent spot to have a color similar to the surrounding.

* * * * *